US010624374B2

(12) United States Patent
Blakey et al.

(10) Patent No.: US 10,624,374 B2
(45) Date of Patent: Apr. 21, 2020

(54) METHODS AND APPARATUSES FOR FREEZING FISH

(71) Applicant: Northline Seafoods, LLC, Sitka, AK (US)

(72) Inventors: Benjamin Blakey, Sitka, AK (US); Gene Glaab, Sitka, AK (US)

(73) Assignee: NORTHLINE SEAFOODS, LLC, Sitka, AK (US)

( * ) Notice: Subject to any disclaimer, the term of this patent is extended or adjusted under 35 U.S.C. 154(b) by 0 days.

(21) Appl. No.: 15/826,318

(22) Filed: Nov. 29, 2017

(65) Prior Publication Data

US 2019/0124960 A1     May 2, 2019

Related U.S. Application Data

(60) Provisional application No. 62/577,618, filed on Oct. 26, 2017, provisional application No. 62/577,634, filed on Oct. 26, 2017.

(51) Int. Cl.
| | |
|---|---|
| *F25D 25/00* | (2006.01) |
| *A23L 3/36* | (2006.01) |
| *A22C 25/04* | (2006.01) |
| *A23B 4/06* | (2006.01) |
| *B63B 35/26* | (2006.01) |
| *B63B 35/14* | (2006.01) |

(52) U.S. Cl.
CPC .............. *A23L 3/361* (2013.01); *A22C 25/04* (2013.01); *A23B 4/062* (2013.01); *B63B 35/14* (2013.01); *B63B 35/26* (2013.01); *A23V 2002/00* (2013.01)

(58) Field of Classification Search
CPC ......... B63B 4/062; B63B 35/26; B63B 25/26; B63B 35/24; B63B 35/14; A23L 3/361; A22C 25/04; A22C 25/00; A23B 4/062; A23B 4/06; A23B 4/066; F25C 2301/002; F25D 3/11; A23V 2002/00
USPC ......................................................... 452/198
See application file for complete search history.

(56) References Cited

U.S. PATENT DOCUMENTS

| | | | |
|---|---|---|---|
| 5,005,364 A * | 4/1991 | Nelson ...................... | F25C 5/00 62/76 |
| 7,048,961 B2 * | 5/2006 | Knauf .................... | A22B 3/083 426/643 |
| 2018/0036773 A1 * | 2/2018 | Arnason ................. | B07C 5/342 |

OTHER PUBLICATIONS

Highland Refrigeration (https://highlandref.com/2012/12/25/blast-freezing/) (Year: 2012).*

* cited by examiner

*Primary Examiner* — Henry T Crenshaw
*Assistant Examiner* — Kamran Tavakoldavani
(74) *Attorney, Agent, or Firm* — Seed Intellectual Property Law Group LLP

(57) ABSTRACT

A method for processing fish can include transporting fully intact fish to a floating vessel, at least one of weighing and sorting the fully intact fish, forming a layer of frozen slime on an outer surface of skin of the fully intact fish, and freezing the fully intact fish by moving the fully intact fish through an ultra-low air temperature region. Related systems and apparatuses are also provided.

22 Claims, 9 Drawing Sheets

METHODS AND APPARATUSES FOR FREEZING FISH

CROSS-REFERENCE TO RELATED APPLICATIONS

This application claims the benefit under 35 U.S.C. § 119(e) of U.S. Provisional Patent Application No. 62/577,618, filed Oct. 26, 2017, and U.S. Provisional Patent Application No. 62/577,634, filed Oct. 26, 2017, which are incorporated herein by reference in their entirety.

BACKGROUND

Technical Field

The present disclosure generally relates to methods and related apparatuses, and systems for freezing fish.

Description of the Related Art

Commercial fishing is widely practiced in the United States and around the world. It is estimated that in 2015 approximately 9.7 billion pounds of seafood, including fish, was landed by commercial fishermen in the United States. The fish are preserved for safe consumption and to maintain the texture and quality of the fish. Preservation techniques generally involve gutting and beheading the fish prior to freezing the fish.

BRIEF SUMMARY

In an implementation, a method for processing fish can include transporting fully intact fish to a floating vessel, at least one of weighing and sorting the fully intact fish, and forming a layer of frozen slime on an outer surface of skin of the fully intact fish. The method can also include freezing the fully intact fish by moving the fully intact fish through an ultra-low air temperature region.

In an implementation, a floating vessel can include a preliminary sorting apparatus that operable to receive fully intact fish from a fishing vessel, and a fish processing region. The fish processing region can include a pre-freeze region that is configured to have a pre-freeze air temperature which facilitates forming a layer of frozen slime on an outer surface of skin of the fully intact fish. The fish processing region can also include an ultra-low temperature region that receives the fully intact fish with the layer of frozen slime on the outer surface of skin of the fully intact fish, the ultra-low temperature region configured to freeze the fully intact fish.

DETAILED DESCRIPTION

In the following description, certain specific details are set forth in order to provide a thorough understanding of various disclosed implementations. One skilled in the relevant art will recognize that implementations may be practiced without one or more of these specific details. In other instances, well-known structures and devices associated with barges, freezers, pumps, cranes, and related apparatuses, systems, and methods may not be shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
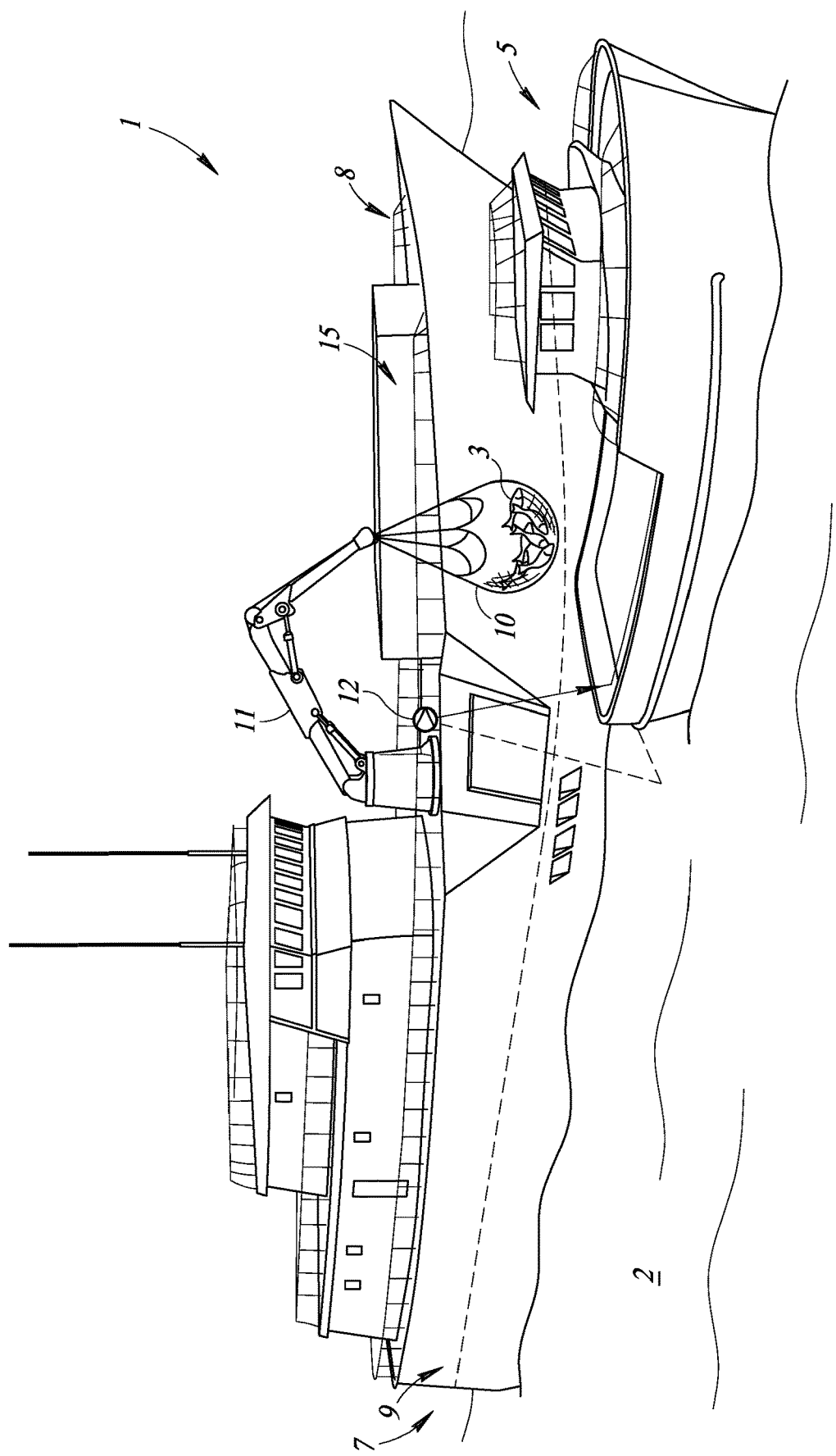
FIG. 1 is a perspective view of an environment that includes a fish processing region, according to one example, non-limiting implementation.

FIG. 1 is a perspective view illustrating an environment 1 in which fish is treated. More generally, fish that are landed by commercial fishermen from a body of water 2 prior to further processing, e.g., gutting or beheading, are referred to as round fish 3, e.g., fish that is fully intact. Typically, preserving fish has involved gutting and/or beheading the round fish 3 for safe preservation prior to freezing. This increases the costs and reduces the flexibility of the preservation process. Thus, it may be desirable to avoid such processing while safely preserving the round fish 3. The various implementations described herein provide methods, apparatuses, and systems that avoid typical processing steps, such as gutting or beheading.

Upon landing, the round fish 3 are transported in a fishing vessel 5 for further processing. In particular, the fishing vessel 5 is navigated to be brought in proximity to a floating vessel 7. A floating vessel 7, in some implementations, can be a barge, as illustrated in FIG. 1. However, other implementations of a floating vessel 7, such as a ship, or a fishing vessel, etc., are also within the scope of the disclosed subject matter. In general, an embodiment treats and/or preserves the round fish 3 on the body of water 2, for example, on the floating vessel 7, in lieu of gutting and/or beheading the round fish 3 for future treatment on land-based environments. The floating vessel 7 can have multiple decks to house various apparatuses and systems. For example, the floating vessel 7 includes an upper deck 8 and a lower deck 9.

In some implementations, the round fish 3 can initially be housed in a brailer bag 10. The round fish 3 housed in the brailer bag 10 are moved from the fishing vessel 5 via a crane 11 to the floating vessel 7 for treatment as described in further detail below. As illustrated in FIG. 1, the crane 11 may be located on the floating vessel 7; however, in other implementations, the crane 11 can be located on the fishing vessel 5, on a platform, or any other location that allows for the round fish 3 to be moved from the fishing vessel 5 to the floating vessel 7. In some implementations, optionally, one or more pumps 12 can be provided. The one or more pumps 12 are generally operable to move the round fish 3 from the fishing vessel 5 to the floating vessel 7. For example, in some implementations, the one or more pumps 12 can be coupled to a storage region located in the fishing vessel 5. In particular, the one or more pumps 12 can be coupled to a storage region located in the fishing vessel 5 to transport or pump round fish 3 from the fishing vessel 5 to the floating vessel 7.

As illustrated in FIG. 1, when the round fish 3 are transported or moved from the fishing vessel 5 to the floating vessel 7, the round fish 3 are moved to a fish processing region 15, components of which can be on the upper deck 8 and/or the lower deck 9. Again, in some implementations, the round fish 3 may be housed in a brailer bag 10 as the round fish 3 are moved to the fish processing region 15, or alternatively, additionally, and/or optionally, the round fish 3 may be transported to the fish processing region 15 via the one or more pumps 12.

Figure 2:
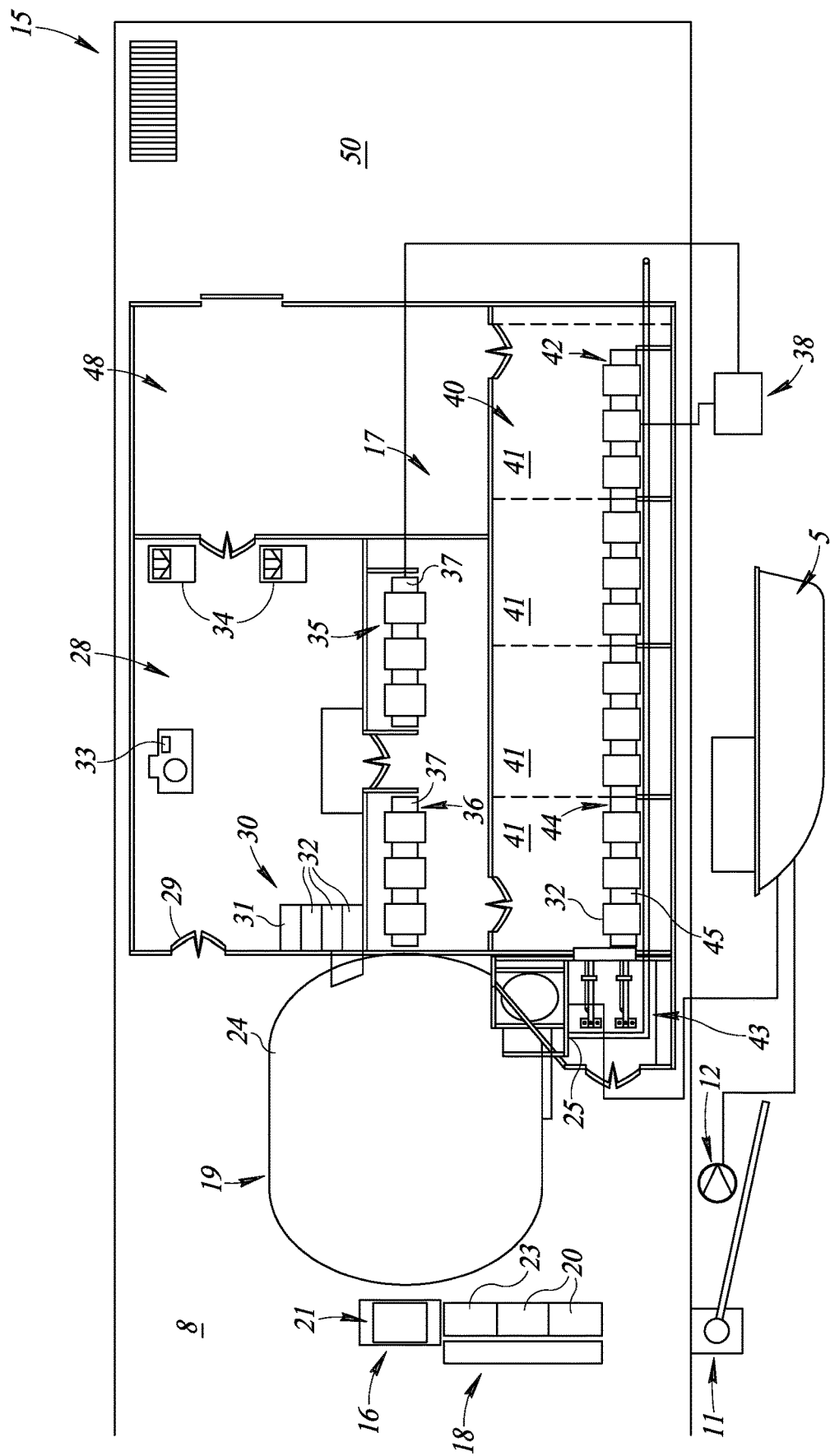
FIG. 2 is a schematic view of portions of a fish procession region, according to one example, non-limiting implementation.

FIG. 2 schematically illustrates an example fish processing region 15 in detail. The fish processing region 15, in this implementation, is located on the upper deck 8. The fish processing region 15 includes a preliminary sorting apparatus 16 and a treatment apparatus 17.

The preliminary sorting apparatus 16 includes a weighing apparatus 18 and a fish holding apparatus 19. The weighing apparatus 18 can include one or more weighing platforms 20 and/or one or more sorting platforms 21. The one or more weighing platforms 20 are generally sized and shaped to receive the round fish 3. In particular, the one or more weighing platforms 20 can include racks, tables, or the like where the round fish 3 are positioned before being removed from the brailer bag 10, or in some implementations, after removal from the brailer bag 10. For example, in some implementations, the crane 11 can be operable to release the round fish 3 from the brailer bag 10 so that the round fish 3 are dropped on the one or more weighing platforms 20. In some implementations, the brailer bag 10 can be moved to the one or more weighing platforms 20 where the round fish 3 can be manually removed from the brailer bag 10 and placed on the one or more weighing platforms 20.

In some implementations, the one or more pumps 12 can be operable to transport the round fish 3 from the fishing vessel 5 to the one or more weighing platforms 20. The one or more weighing platforms 20 also include weighing scales 23 and optionally temperature gauges. The weighing scales 23 are generally operable to weigh the round fish 3 that have been transported from the fishing vessel 5. The optional temperature gauges are operable to determine temperatures of the round fish 3. For example, in some implementations, a temperature of a sample of round fish 3 can be determined. The sample can include separating the round fish 3 into various groups to estimate the temperatures of the round fish 3 of each group.

After weighing the round fish 3 via the one or more weighing scales 23 of the weighing platforms 20, the round fish 3 can be moved to the one or more sorting platforms 21. The one or more sorting platforms 21 can also include tables, racks, or the like. At the one or more sorting platforms 21, the round fish 3 can be sorted based on one or more parameters. For example, the round fish 3 can be sorted for weight, type, size, temperature, etc. Moreover, in some implementations, the one or more sorting platforms 21 can operate as an inspection juncture. For example, the round fish 3 may be inspected by one or more fish meters. The one or more fish meters may determine contamination of the round fish 3, radiation levels, or other safety and quality parameters related to the round fish 3. The round fish 3 may also optionally be tagged with identifying markers at the one or more sorting platforms 21.

The fish holding apparatus 19 includes one or more tanks 24 and one or more ice slush machines 25. The fish holding apparatus 19 or components thereof, in some implementations, may be located on the upper deck 8, as illustrated in FIG. 2. In other implementations, the fish holding apparatus 19 or components thereof may be located on the lower deck 9.

In particular, the round fish 3 are transported from the one or more sorting platforms 21 to be housed in the one or more tanks 24. In some implementations, the round fish 3 may be manually moved from the one or more sorting platforms 21 to the one or more tanks 24 or, alternatively, the round fish 3 may be moved via elevators, conveyors, or other automated transporting systems. The one or more tanks 24 are in fluid communication with the one or more ice slush machines 25. The one or more ice slush machines 25 include ice, for example, in the form of ice crystals, which may be suspended in a carrier liquid, such as sea water, brine, fresh water, and/or combinations thereof to form an ice slurry mix. For example, fresh water can be provided by a potable water source. For example, sea water can be provided directly from the body of water 2, or some other tank or holding container that contains sea water. Similarly, brine can also be provided from a tank or some other holding container that contains brine. Thus, the fresh water and the sea water and/or the brine can be mixed together with ice to form an ice slurry mix. In particular, the one or more ice slush machines 25 generally operate to form the ice slurry mix that is fluidly coupled to the one or more tanks 24 to provide the ice slurry mix to the one or more tanks 24. As the ice slurry mix is fluidly communicated to the one or more tanks 24 with the round fish 3 housed therein, the one or more tanks 24 form a thermal storage system for preserving the round fish 3 before further processing as described in more detail below.

In particular, the ice slurry mix provides a desirable heat transfer coefficient to enable preservation of the round fish 3 for a determined duration threshold, which may be predetermined. For example, in some implementations, the one or more ice slush machines 25 can be configured to provide the ice slurry mix to the one or more tanks 24 to enable safe preservation for between 1 hour to 48 hours. In some implementations, the one or more ice slush machines 25 can be configured to provide the ice slurry mix to the one or more tanks 24 that can safely preserve the round fish 3 for longer durations, for example, between 48 hours and 120 hours. In some implementations, the one or more ice slush machines 25 can optionally be in fluid communication with the fishing vessel 5. For example, the one or more ice slush machines 25 can include conduits that fluidly couple the one or more ice slush machines 25 to tanks or other apparatuses of the fishing vessel 5 to transport the ice slurry mix.

As illustrated in FIG. 2, the fish processing region 15 includes a racking region 28. The racking region 28 is generally a room that is isolated from the surrounding environment via one or more doors 29 that can be opened and closed. For example, the racking region 28 can be substantially adiabatically isolated from the surrounding environment to prevent or restrict heat transfer between the round fish 3 and the surrounding system. Substantially isolating the racking region 28 prevents, restricts, or minimizes air flow of wet air which facilitates restricting or minimizing moisture incursion into the round fish 3.

The racking region 28 includes a racking apparatus 30 where the round fish 3 are racked. In particular, the racking apparatus 30 can include a racking table 31 and a plurality of racks 32. The racking table 31 is generally sized and shaped to receive the round fish 3 from the fish holding apparatus 19. From the racking table 31, the round fish 3 can be placed on the one or more racks 32 to be transported to other regions of the fish processing region 15 as explained in more detail below. In some implementations, the racking region 28 may also optionally include one or more cameras 33 and one or more weighing scales 34. The one or more cameras 33 can be communicably coupled to other control systems. In particular, the one or more cameras 33 can capture images of the round fish 3 and communicate to users, inspectors, or the like, information about the round fish 3 to determine quality thereof. The optional one or more weighing scales 34 can weigh the round fish 3 prior to further processing. For example, round fish 3 located on racks 32 can be directly placed on the weighing scales 34 to determine weight. Alternatively, the round fish 3 that have been discarded can be removed from the racks 32 and placed to be weighed via the weighing scales 34.

The round fish 3 are subsequently transported from the racking region 28 to the treatment region 17. The treatment region 17 includes a pre-freeze region 35 that receives the round fish 3 from the racking region 28 and an ultra-low temperature region 40. For example, the round fish 3 positioned on the racks 32 can be manually moved to the pre-freeze region 35 or, alternatively, the racks 32 may be moved via conveyors, or other automated transporting systems. The pre-freeze region 35 includes one or more heat exchangers 36. The heat exchangers 36 can take a wide variety of forms. For example, in some implementations, as illustrated in FIG. 2, the heat exchangers 36 can take the form of an evaporator 37 that is in fluid communication with a refrigerant source 38, such as for example, various hydrofluorocarbons or blends thereof. In one example, the refrigerant may be Freon; however, other forms of refrigerants are also within the scope of the disclosed subject matter, such as for example, ammonia (e.g., $NH_3$). In particular, as the liquid refrigerant flows to the evaporator 37, a thermal exchange reaction causes the refrigerant source to evaporate and absorb heat from the air in the pre-freeze region 35.

More particularly, the one or more heat exchangers 36, e.g., evaporators 37, are sized and shaped to cause reduction of moisture in the air inside the pre-freeze region 35, thereby facilitating forming a thin layer on the round fish 3, such as, for example, a thin layer of frozen slime, on an outer surface of the round fish 3. In addition to forming the thin layer on the round fish 3, the evaporators 37 may freeze the skin and/or cool the round fish 3. In some implementations, the pre-freeze region 35 may also include one or more blowers that may cooperate with the evaporators 37 to cool and/or freeze the skin of the round fish 3 and prevent moisture in the air as described above. In some implementations, the heat exchangers 36 can be operable to cool and maintain an air temperature in the pre-freeze region to anywhere between −20 to −70 degrees Fahrenheit. In some implementations, the round fish 3 can be stored in the pre-freeze region 35 for a duration of 5 to 45 minutes prior to further processing, which may depend on the amount of moisture in the air in the pre-freeze region 35. However, other durations and temperatures are within the scope of disclosed subject matter.

In particular, the pre-freeze region 35 is operable to cool the round fish 3 for a relatively short duration, freeze the skin of the round fish 3, reduce or prevent moisture incursion, and/or form an outer layer of frozen slime on the round fish 3. Again, as illustrated in FIG. 2, the pre-freeze region 35 can be in a room that is thermally or adiabatically isolated from the surrounding environment.

From the pre-freeze region 35, as illustrated in FIG. 2, the round fish 3 positioned on the racks 32 are moved to an ultra-low temperature region 40 of the treatment region 17. In the ultra-low temperature region 40, the round fish 3 are generally frozen and further cooled to ultra-low temperatures. In particular, the racks 32 having the round fish 3 thereon are moved in the ultra-low temperature region 40 to allow the round fish 3 to be cooled to temperatures of at least −10 degrees Fahrenheit while exposed to ultra-low temperatures that may be within a range of −50 to −80 degrees Fahrenheit. In some implementations, the round fish 3 may move in the ultra-low temperature region 40 between a plurality of zones 41 for a duration of between two to five hours from a first zone 41 to a terminal zone 41. The plurality of zones 41 may allow for gradual and continuous cooling of the round fish 3 as they are moved between the zones 41. In some implementations, the round fish 3 may have different temperatures as they move between the zones. For example, the round fish 3 may have a higher temperature in the first zone 41 than a terminal zone 41. In such implementations, any excess cooling capacity may be utilized for other applications, such as in the pre-freeze region 35, or elsewhere. In some implementations, the ultra-low temperature region 40 includes a blast freezer apparatus 42 to freeze and/or cool the round fish 3 to temperatures while exposed to air in the ultra-low temperature 40 that may be within the range of −50 to −80 degrees Fahrenheit. The blast freezer apparatus 42 includes a ram assembly 43 and one or more blast thermal exchangers 44. Each of the one or more blast thermal exchangers 44 can be located in a corresponding one of the plurality of zones 41.

Again, as described above, the one or more blast thermal exchangers 44 can include a blast evaporator 45 that is in fluid communication with the refrigerant source 38, such as for example, various hydrofluorocarbons or blends thereof. Again, as described above, in one implementation, the refrigerant source 38 may comprise Freon. Although the implementation of FIG. 2 illustrates the same refrigerant source 38 providing the liquid refrigerant, such as Freon, to the blast evaporators 45 of the ultra-low temperature region 40 as the evaporators 37 of the pre-freeze region 35, in some implementations, a different refrigerant source may be in fluid communication with the blast evaporators 45 to provide the refrigerant as described above. Moreover, as the liquid refrigerant flows to the blast evaporators 45, a thermal exchange reaction causes the refrigerant source to evaporate and absorb heat from the air in the ultra-low temperature region 40. Again, as illustrated in FIG. 2, the ultra-low temperature region 40 may be isolated from the surrounding environment. The ram assembly 43 is operable to move the racks 32 through the different zones 41.

In some implementations, the round fish 3, after passing through the ultra-low temperature region 40, may, optionally, be moved to a holding region 48. For example, in some implementations, some of the round fish 3, for example salmon, may be thawed or, more generally, warmed before being moved to an end user. In some implementations, however, the round fish 3 may be directly moved to a loading region 50 upon passing through the ultra-low temperature region 40 for transportation to the end user, such as, for example, processing factories, by-product processors, or local consumers, etc. For example, the racks 32 may be loaded to containers for transportation to the end user.

Figure 3:
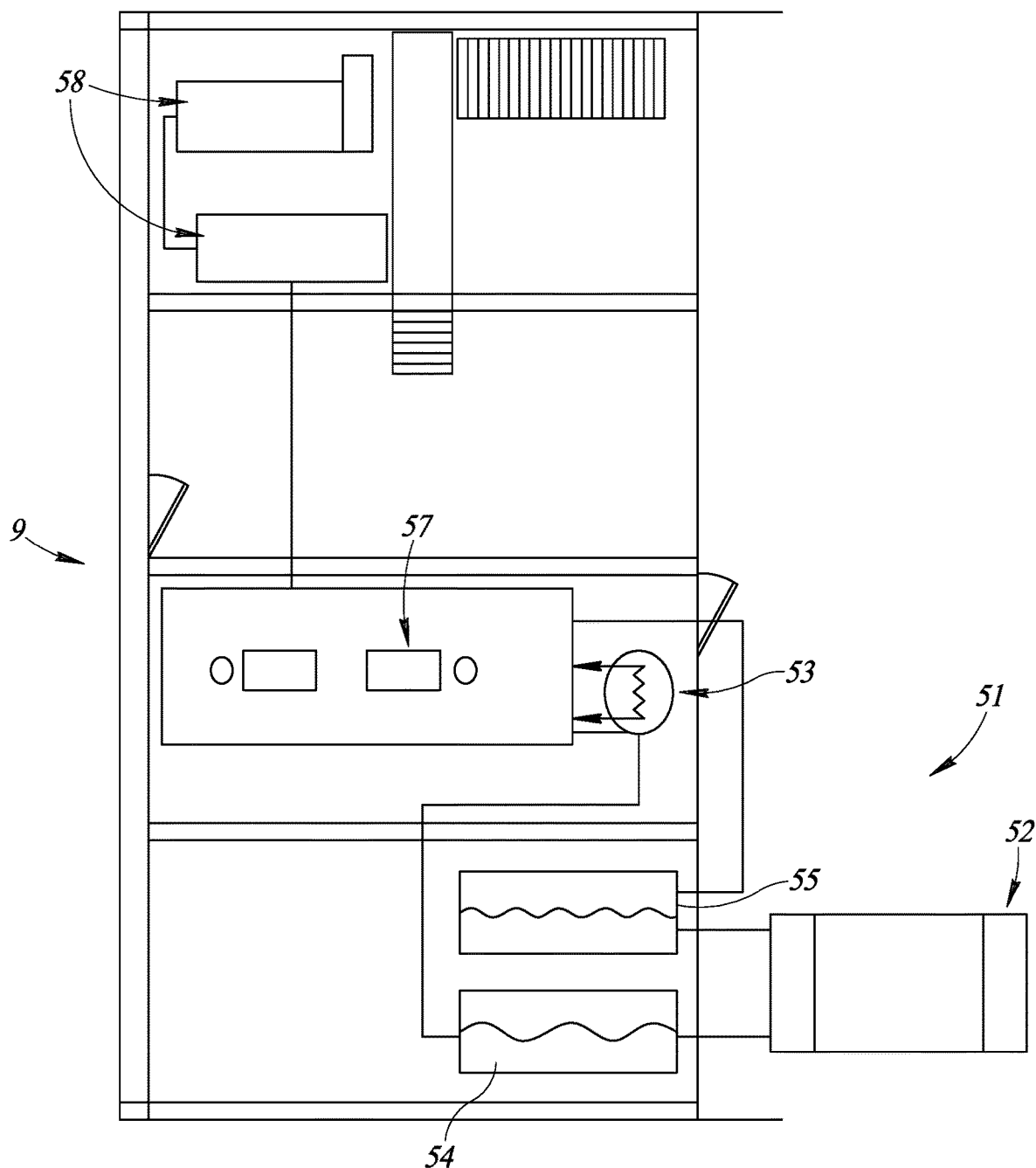
FIG. 3 is a schematic view of a refrigeration system of a fish processing region, according to one example, non-limiting implementation.

FIG. 3 illustrates portions of a refrigeration system 51 that is coupled to one or more evaporators 52, e.g., evaporators 37 and/or blast evaporators 45, described above. The refrigeration system 51 can be located in the lower deck 9, for example, in an engine room of the floating vessel 7. The refrigeration system 51 includes one or more compressors 57 and condensers 53. The refrigeration system 51 also includes a high pressure vessel 54 and a low pressure vessel 55. The high pressure vessel 54 is sized and shaped to include therein liquid refrigerant, for example, Freon. The liquid refrigerant is directed to the one or more evaporators 52. The one or more evaporators 52 can be the evaporators 37 of the pre-freeze region 28 and/or the blast evaporators 45. Thus, a refrigerant source, for example refrigerant source 38 described above and illustrated in FIG. 2, can be the high pressure vessel 54. As the liquid refrigerant passes through the evaporators 52, as described above, a thermal exchange reaction causes the liquid refrigerant to evaporate and absorb heat from the air in the surrounding region, for example, the ultra-low temperature region 40, the pre-freeze region 35, etc. A vaporized form of the refrigerant, upon undergoing evaporation via the evaporators 52, is directed to the one or more compressors 57 from the low-pressure vessel 55. The vaporized form of the refrigerant is pressurized and a temperature thereof is raised in the one or more compressors 57. The high pressure and temperature form of the refrigerant is thereafter directed to the one or more condensers 53. The one or more condensers 53 transform the refrigerant to the liquid refrigerant, which is thereafter directed to the high-pressure vessel 54 to be directed to the evaporators 52 as described above.

In some implementations, the one or more condensers 53 may be water-based condensers or air-based condensers. Although not shown for the sake of clarity of description and illustration, the refrigeration system 51 can also include valves, conduits, meters, blowers, fans, pumps, etc. For example, valves can be provided to expand the refrigerant, or more generally control the flow of the refrigerant. For example, meters can be provided to measure flow rates of the refrigerants at various junctures of the refrigeration system 51. For example, conduits can interconnect the various components of the refrigeration system 51 described herein. For example, the blowers, fans, pumps can direct, control and/or cause the flow of refrigerant. As illustrated in FIG. 3, the refrigeration system 51 can also include one or more generators 58. The one or more generators 58 are operable to provide power to one or more components of the refrigeration system 51, for example, compressors 57, pumps, fans, blowers, etc.

Figure 4:
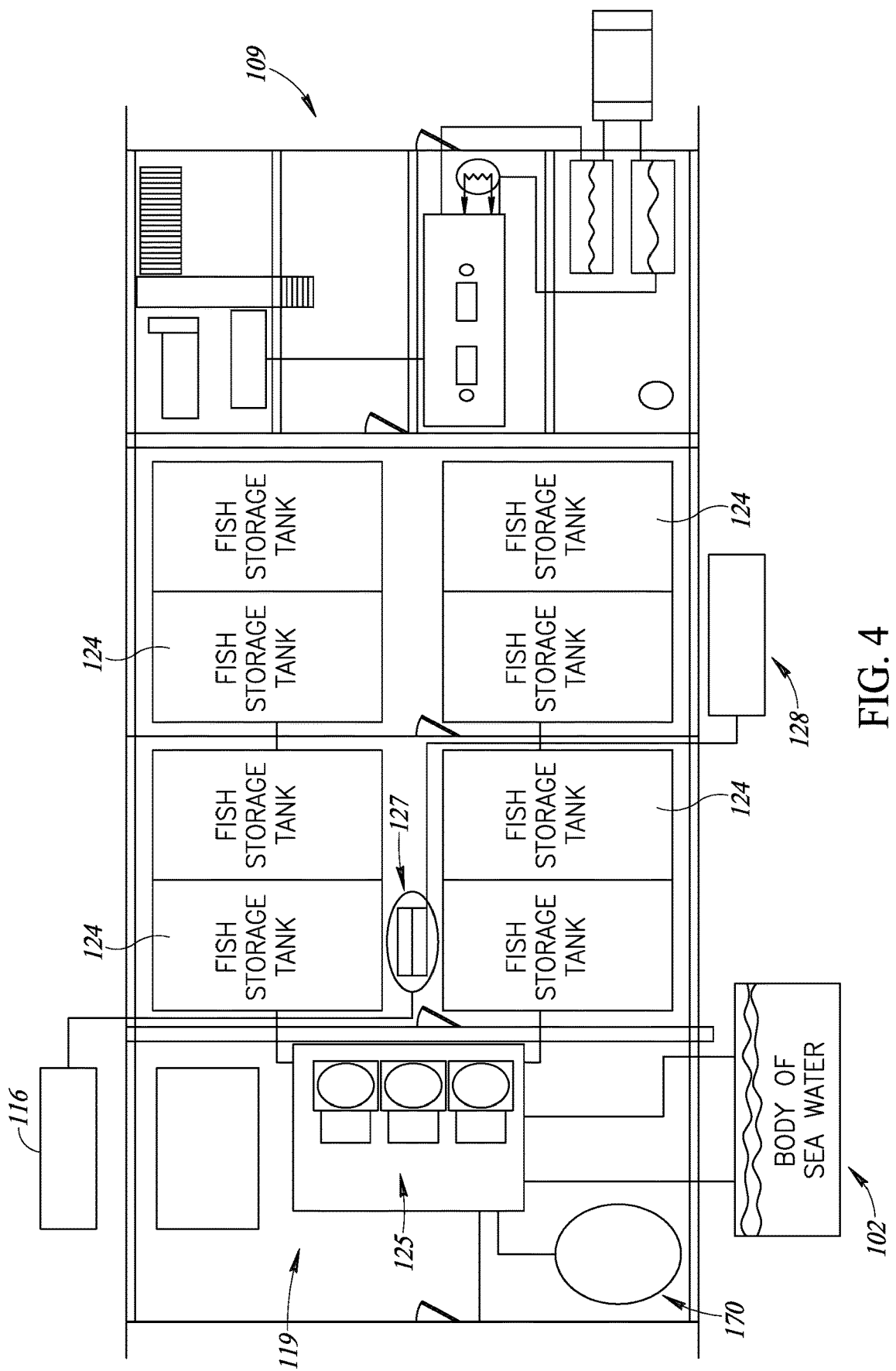
FIG. 4 is a schematic view of portions of a fish processing region, according to one example, non-limiting implementation.

As described above, in some implementations, a fish holding apparatus can be located in a lower deck of the floating vessel 7. FIG. 4 illustrates a fish holding apparatus 119 according to one example implementation that is located in lower deck 109 of the floating vessel 7. The fish holding apparatus 119 includes a plurality of tanks 124 and an ice slush machine 125. As described above, the ice slush machine 125 includes ice, for example, in the form of ice crystals, which may be suspended in a carrier liquid, such as sea water, brine, fresh water, and/or combinations thereof, to form an ice slurry mix. In this implementation, a potable water tank 170 is fluidly coupled to the ice slush machine 125 which provides fresh water. The ice slush machine 125 is fluidly coupled to external body of water 102 which serves as a source of sea water. In this manner, the ice slush machine 125 forms ice slurry mix. The ice slush machine 125 is fluidly coupled to the plurality of tanks 124. Each of the plurality of tanks 124 is sized and shaped to hold round fish 3 received from a weighing apparatus, e.g., weighing apparatus 18, of a preliminary sorting apparatus 116, e.g., preliminary sorting apparatus 16. The round fish 3 can be transported to the tanks 124 manually or via some automated system. For example, FIG. 4 illustrates one or more elevators 127. The one or more elevators 127 are operable to transport the round fish 3 from the preliminary sorting apparatus 116 to the tanks 124. The one or more elevators 127 are also operable to transport the round fish 3 from the tanks 124 to a racking region racking region 128, e.g., racking region 28.

Figure 5:
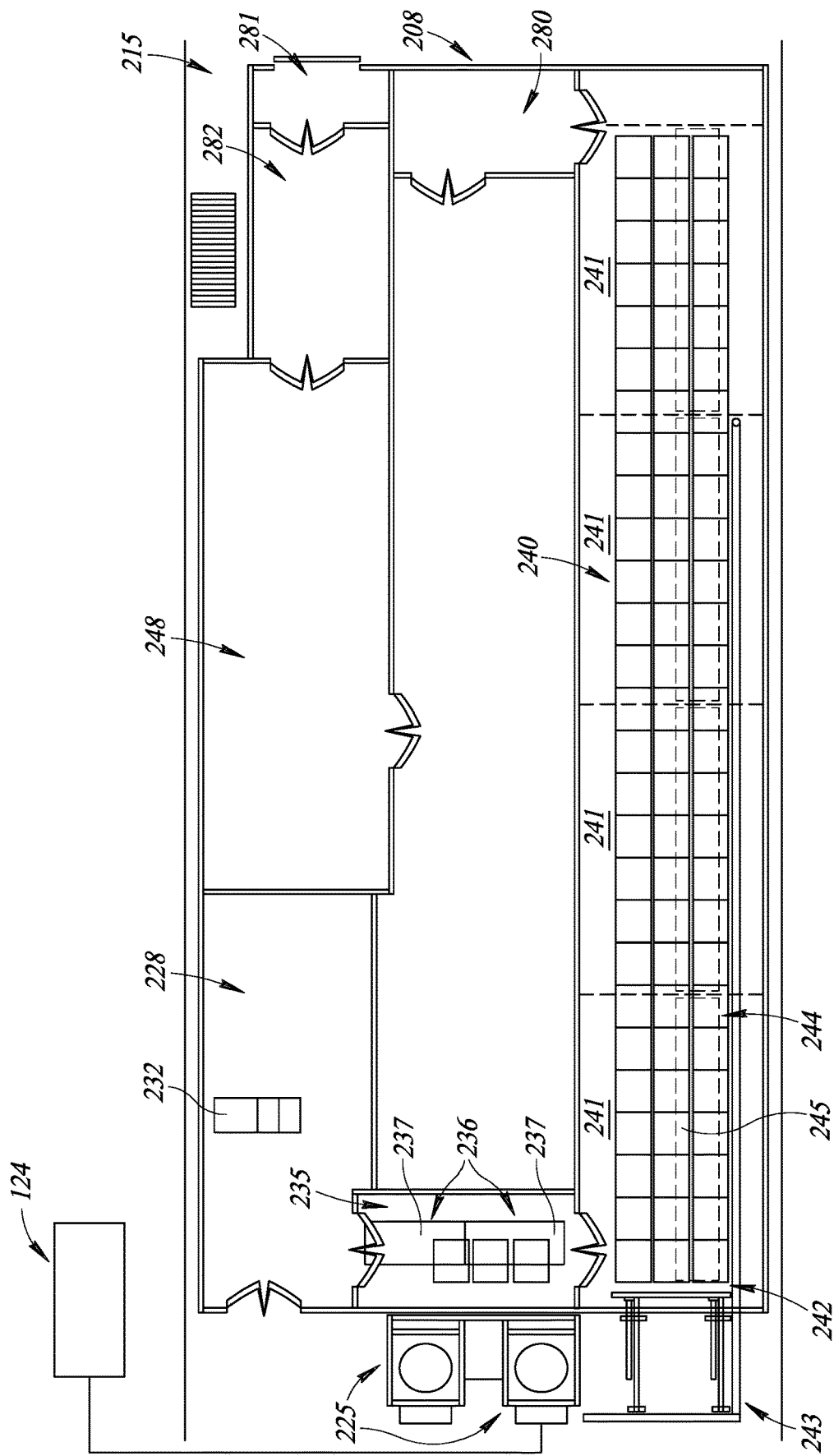
FIG. 5 is a schematic view of portions of a fish processing region, according to one example, non-limiting implementation.

FIG. 5 illustrates a fish processing region 215, according to another implementation. The fish processing region 215 illustrates components thereof that are located on an upper deck 208 of a floating vessel, e.g., floating vessel 7. The fish processing region 215 is generally similar to the fish processing region 15 illustrated in FIGS. 1 through 2, but provides certain variations. The fish processing region 215 includes a pair of ice slush machines 225. The ice slush machines 225 can be similar to ice slush machines 25 that provide an ice slurry mix. In this implementation, the pair of ice slush machines 225 are located on the upper deck 208 and are in fluid communication with tanks that are located on a lower deck, e.g., tanks 124 illustrated in FIG. 4. Again, round fish 3 that may be stored or located in such tanks can be transported to the upper deck 208 for processing manually or via elevators, e.g., elevators 127. The fish processing region 215 includes a racking region 228 that can be similar to the racking region 28 described and illustrated in FIG. 2. As described above, round fish 3 can be racked by being placed on racks 232. Again, the round fish 3 or discarded round fish 3 can also be weighed, or images thereof be captured in the racking region 228.

The fish processing region 215 includes a pre-freeze region 235. Again, as described above, the round fish 3 positioned on racks 232 can either be manually, or via an automated system, moved to the pre-freeze region 235. The pre-freeze region 235 includes one or more heat exchangers 236, for example, in the form of evaporators 237 that are in fluid communication with a refrigerant source, such as for example Freon. Again, the evaporators 237 can be similar to the evaporators 37 described above and illustrated in FIG. 2. The round fish 3 in the pre-freeze region 235 can be cooled so as to form a thin layer on the round fish 3, such as, for example, a thin layer of frozen slime, freeze the skin of the round fish 3, and/or more generally lower the temperature of the round fish 3, while exposed to air temperatures anywhere between −20 to −70 degrees Fahrenheit. Again, the round fish 3 may remain in the pre-freeze region 235 for a duration of, for example, between 5 to 45 minutes prior to further processing.

The fish processing region 215 includes an ultra-low temperature region 240. The ultra-low temperature region 240 can be similar to the ultra-low temperature region 40 described above and illustrated in FIG. 2. The ultra-low temperature region 240 allows the round fish 3 to be cooled to temperatures of about at least −10 degrees Fahrenheit while exposed to ultra-low air temperatures within a range of −50 to −80 degrees Fahrenheit. The fish processing region 215 also includes a plurality of zones 241 through which the round fish 3 are moved for a duration of, for example, between two to five hours. Again, the ultra-low temperature region 240 includes a blast freezer apparatus 242 to cool the round fish 3 while exposed to air temperatures within the range of minus 50 to minus 80 degrees Fahrenheit. The blast freezer apparatus 242 includes a ram assembly 243 and one or more blast thermal exchangers 244, such as blast evaporators 245. The blast evaporators 245 can be similar to blast evaporators 45 described above and illustrated in FIGS. 2 and 3. The ram assembly 243 is operable to move the racks 232 through the different zones 241.

In this implementation, the fish processing region 215 includes a plurality of air isolation chambers 280, 281, 282. The air isolation chamber 280 is positioned adjacent to the ultra-low freeze region 240, with the air isolation chamber 281 positioned adjacent to the air isolation chamber 280, and the air isolation chamber 282 positioned adjacent to the air isolation chamber 281. The arrangement of air isolation chambers 280, 281, 282 facilitates thermally isolating the ultra-low freeze region 240 from the outside environment, allowing cooling of the round fish 3 therein and preventing moisture incursion. The fish processing region 215 may also optionally include a holding region 248. For example, in some implementations, some round fish 3, for example salmon, may be thawed or, more generally, warmed in the holding region 248 before being moved to an end user. In some implementations, however, the round fish 3 may be directly moved to a loading region upon passing through the ultra-low temperature region 240 for transportation to the end user. For example, the racks 32 may be loaded to containers for transportation to the end user, such as, for example, processing factories, by-product processors, or local consumers, etc.

Figure 6:
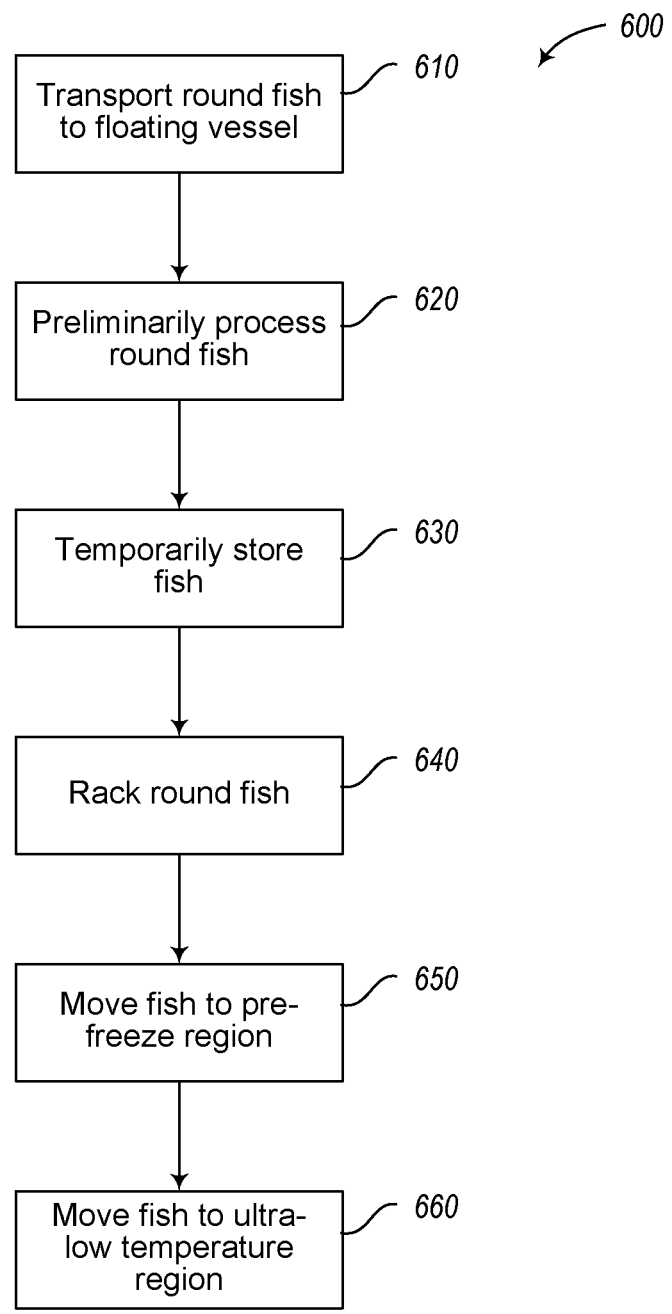
FIG. 6 is flow diagram illustrating a high-level method of processing fish, according to one example, non-limiting implementation.

FIG. 6 illustrates a high-level method 600 of processing round fish 3. At 610, round fish 3 is transported, transferred, or moved to a floating vessel, e.g., floating vessel 7, from a fishing vessel, e.g., fishing vessel 5. For example, the round fish 3 can be moved via a crane, e.g., crane 11, from the fishing vessel to the floating vessel, or be pumped via pumps, e.g., pumps 12. Again, in some implementations, the round fish 3 can be disposed or contained in brailer bags 10, from which the round fish 3 may be subsequently removed.

At 620, the round fish 3 are preliminarily processed. For example, the preliminary processing may include weighing, discarding of unwanted fish, sorting, inspecting, obtaining temperatures, capturing images, etc., as described above.

At 630, the round fish 3 are temporarily stored. For example, the round fish 3 may be housed in one or more tanks, e.g., tanks 24, 124, etc. Again, the tanks may be in fluid communication with one or more ice slush machines, e.g., ice slush machines 25, 125, 225, etc.

At 640, the round fish 3 are racked. For example, the round fish 3 can be moved to a racking region, e.g., racking region 28, 228, and placed on a racking table, e.g., racking table 31, and/or racks, e.g., racks 32, 232, etc.

At 650, the racked round fish 3 are moved to a pre-freeze region, e.g., pre-freeze region 35, 235, etc. In the pre-freeze region, the round fish 3 can be cooled so as to form a thin layer on the round fish 3, such as, for example, a thin layer of frozen slime, freeze the skin of the round fish 3, and/or more generally lower the temperature of the round fish 3, while exposed to various air temperatures described herein, for example, between −20 and −70 degrees Fahrenheit.

At 660, the round fish 3 are moved from the pre-freeze region to an ultra-low temperature region, e.g., ultra-low temperature region 40, 240, etc. In the ultra-low temperature region, the round fish 3 are exposed to various ultra-low air temperatures described herein, for example, between −50 and −80 degrees Fahrenheit, which can cool the round fish 3 to temperatures of about at least −10 degrees Fahrenheit.

Figure 7:
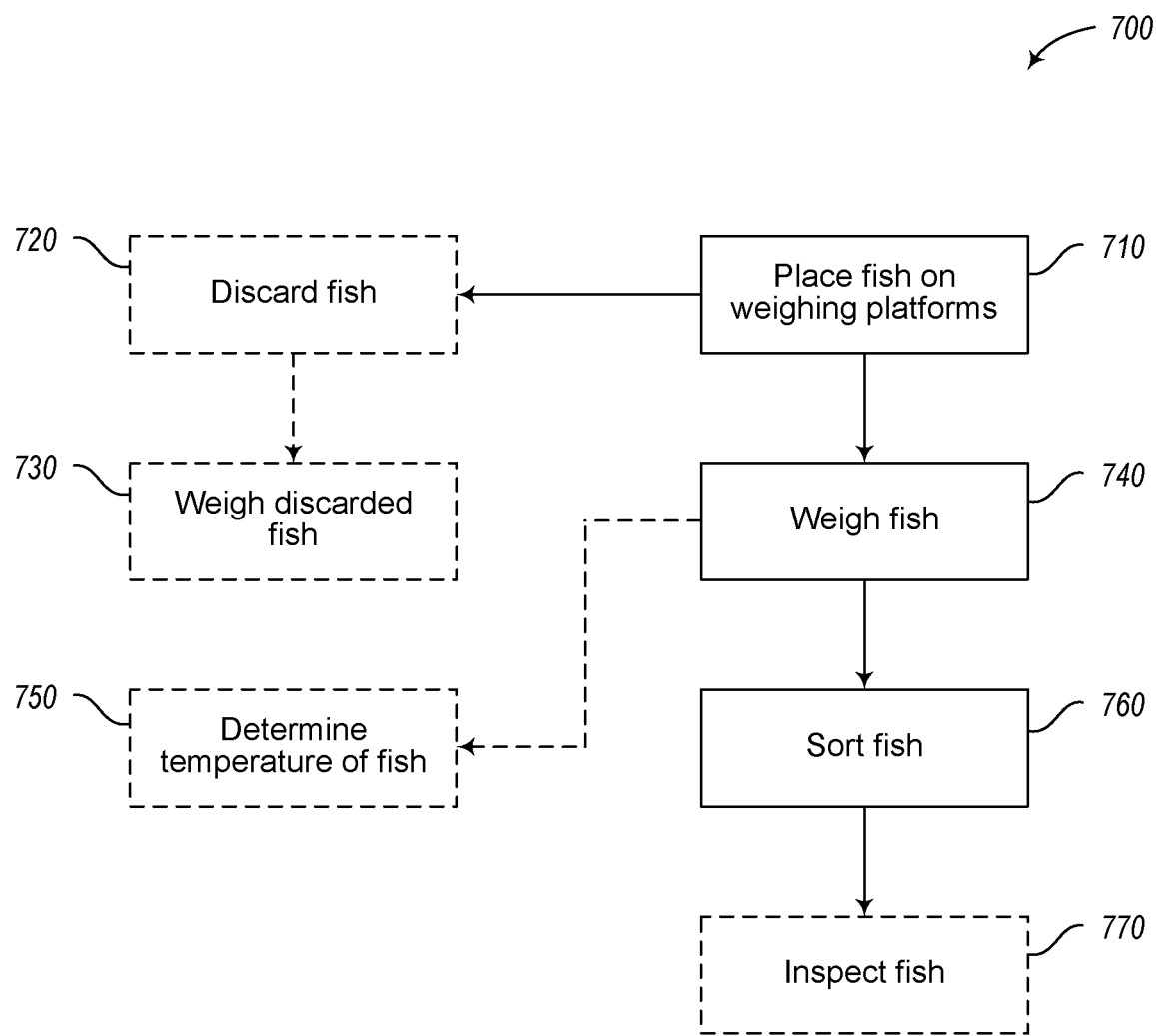
FIG. 7 is flow diagram illustrating a high-level method of a preliminarily processing fish, according to one example, non-limiting implementation.

FIG. 7 illustrates a high level method 700 of preliminarily processing round fish 3, as the floating vessel, e.g., floating vessel 7, receives round fish 3 from the fishing vessel, e.g., fishing vessel 5. At 710, round fish 3 are placed on weighing platforms, e.g., weighing platforms 20.

In some implementations, at 720, optionally, unwanted round fish are discarded. At 730, optionally, the discarded round fish 3 may be weighed via one or more weighing scales.

At 740, the round fish 3 are weighed via one or more weighing scales, e.g., weighing scales 23.

At 750, optionally, temperature of the round fish 3 is determined via one or more temperature gauges.

At 760, the round fish 3 are sorted via one or more sorting platforms, e.g., sorting platforms 21. For example, the round fish 3 can be sorted for weight, type, size, temperature, etc.

At 770, optionally, the round fish 3 are inspected by, for example, one or more fish meters. The one or more fish meters may determine contamination of the round fish 3, radiation levels, or other safety and quality parameters related to the round fish 3. The round fish 3 may also optionally be tagged with identifying markers during inspection.

Figure 8:
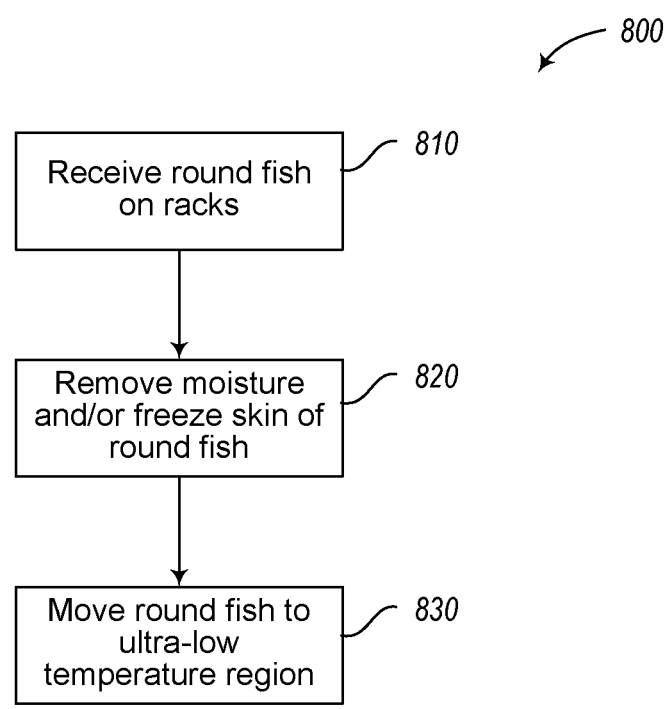
FIG. 8 is a flow diagram illustrating a high level method of pre-freezing fish, according to one example, non-limiting implementation.

FIG. 8 illustrates a high-level method 800 of pre-freezing round fish 3. At 810, the round fish 3 are received in a pre-freeze region, e.g., pre-freeze region 35, 235, etc. The round fish 3 may be on racks as described above.

At 820, moisture in, on, or around the round fish 3, for example, in the air in the pre-freeze region, is reduced and/or removed. For example, the pre-freeze region may include one or more evaporators, e.g., evaporators 37, 237 that remove or reduce moisture on the round fish 3 and form a thin layer of frozen slime on an outer surface of the round fish 3, and/or freeze the skin of the round fish 3. For example, the round fish 3 are subjected to the various temperatures described herein, for example, anywhere between −20 to −70 degrees Fahrenheit, thereby freezing skin of the round fish 3 and/or creating a thin layer of frozen slime on the outer surface of the skin of the round fish 3. For example, the one or more evaporators are fluidly coupled to a refrigerant source providing, for example, Freon, that cools and freezes the skin of the round fish 3 while subjected to air temperatures anywhere between −20 to −70 degrees Fahrenheit.

At 830, the round fish 3 having the thin layer of frozen slime on the outer surface thereof and/or with the frozen skin is moved to an ultra-low temperature region, e.g., ultra-low temperature region 40, 240, etc.

Figure 9:
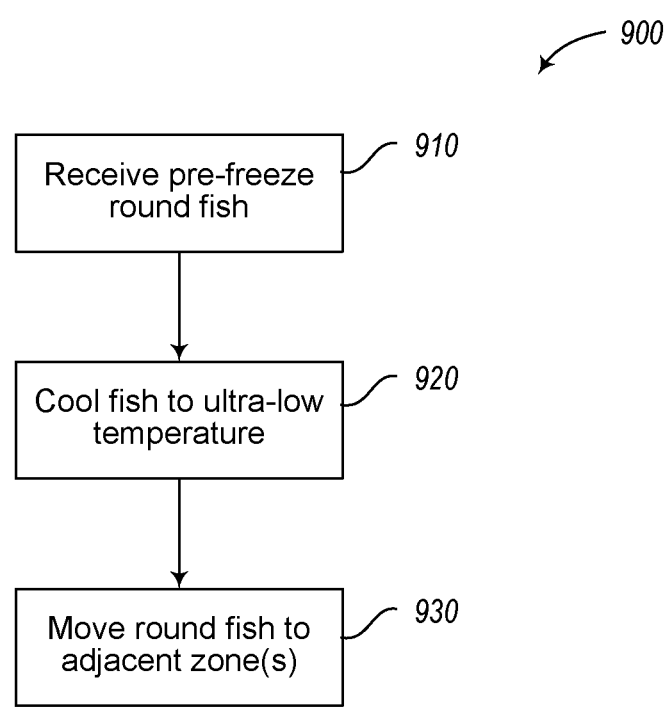
FIG. 9 is a flow diagram illustrating a high-level method of freezing fish.

FIG. 9 illustrates a high-level method 900 of freezing round fish 3 while subjected to ultra-low air temperatures. At

910, round fish 3 that has been in a pre-freeze region, e.g., pre-freeze region 35, 235, etc., is received in the ultra-low temperature region, e.g., ultra-low temperature region 40, 240, etc.

At 920, the round fish 3 are cooled to a temperature of at least about −10 degrees Fahrenheit while exposed to various ultra-low temperatures described herein, for example, anywhere between −50 to −80 degrees Fahrenheit. For example, the ultra-low temperature region includes one or more blast evaporators, e.g., blast evaporators 45, 245, etc., that are fluidly coupled to a refrigerant source providing, for example, Freon, that cools and/or freezes the round fish 3 while exposed to air temperatures of anywhere between −50 to −80 degrees Fahrenheit.

At 930, the round fish 3 are moved in the ultra-low temperature region between adjacent zones, for example zones 41, via a ram assembly, for example ram assembly 43, 243. Again, as the round fish 3 are moved between adjacent zones, the temperature of the round fish 3 is cooled to, and maintained to a temperature of at least about −10 degrees Fahrenheit while exposed to air temperatures of anywhere between −50 to −80 degrees Fahrenheit.

Thereafter, the round fish 3 cooled and/or frozen while exposed to ultra-low air temperatures can be moved to a holding region, e.g., holding region 48, 248, or loading region, e.g., loading region 50, etc.

The various implementations described above can be combined to provide further implementations. Moreover, some embodiments may take the form of or comprise computer program products. For example, according to one embodiment, a computer readable medium comprising a computer program can be adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, RNS circuitry, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for processing fish, the method comprising:
transporting fully intact fish to a floating vessel, the fully intact fish comprising round fish;
at least one of weighing and sorting the fully intact fish;
pre-freezing the fully intact fish at a first temperature range, the pre-freezing forming a layer of frozen slime on an outer surface of skin of the fully intact fish; and
freezing the fully intact fish at a second temperature range by moving the fully intact fish through an ultra-low air temperature region.

2. The method of claim 1 wherein pre-freezing the fully intact fish by forming the layer of frozen slime includes exposing the fully intact fish to air temperatures of between −20 degrees Fahrenheit and −70 degrees Fahrenheit.

3. The method of claim 1 wherein forming the layer of frozen slime includes positioning the fully intact fish in a pre-freeze region that includes an evaporator, the evaporator being configured to provide air temperatures of between −20 degrees Fahrenheit and −70 degrees Fahrenheit in the pre-freeze region.

4. The method of claim 3 wherein the evaporator is fluidly coupled to a refrigerant source, the refrigerant source comprising Freon.

5. The method of claim 1 wherein freezing the fully intact fish includes exposing the fully intact fish to ultra-low air temperatures of between −50 degrees Fahrenheit to −80 degrees Fahrenheit, which cools the fully intact fish to a temperature of at least −10 degrees Fahrenheit.

6. The method of claim 1 wherein freezing the fully intact fish includes positioning the fully intact fish in an ultra-low temperature region that includes a blast evaporator, the blast evaporator being configured to provide air temperatures of between −50 degrees Fahrenheit and −80 degrees Fahrenheit in the ultra-low temperature region.

7. The method of claim 6 wherein the blast evaporator is fluidly coupled to a refrigerant source, the refrigerant source comprising Freon.

8. The method of claim 1 wherein freezing the fully intact fish includes moving the fully intact fish through a plurality of zones of an ultra-low temperature region.

9. The method of claim 1, further comprising:
prior to forming a layer of frozen slime on an outer surface of skin of the fully intact fish, storing the fully intact fish in one or more tanks, the one or more tanks being in fluid communication with one or more ice slush machines.

10. The method of claim 9 wherein the one or more ice slush machines are configured to fluidly communicate an ice slurry mix to the one or more tanks, the ice slurry mix comprising ice and a carrier liquid.

11. The method of claim 1 wherein the fully intact fish remains in the ultra-low temperature region for a duration of between two to five hours.

12. The method of claim 1 wherein the fully intact fish remains in a pre-freeze region wherein the layer of frozen slime is formed on the outer surface of skin of the fully intact fish for a duration of between five to forty five minutes.

13. The method of claim 1 wherein sorting the fish includes separating the round fish based on at least one of weight of round fish, size of round fish, type of round fish, or internal temperature of round fish.

14. A floating vessel, comprising:
a preliminary sorting apparatus operable to receive fully intact fish that comprises round fish from a fishing vessel; and
a fish processing region including:
a pre-freeze region that is configured to have a pre-freeze air temperature which facilitates forming a layer of frozen slime on an outer surface of skin of the fully intact fish; and an ultra-low temperature region that receives the fully intact fish with the layer of frozen slime on the outer surface of skin of the fully intact fish, the ultra-low temperature region configured to freeze the fully intact fish.

15. The floating vessel of claim 14, further comprising:
one or more evaporators that are operable to provide the pre-freeze air temperature, the pre-freeze air temperature being between −20 degrees Fahrenheit to −70 degrees Fahrenheit.

16. The floating vessel of claim 15 comprising a refrigerant source that is fluidly coupled to the one or more evaporators, the refrigerant source providing Freon.

17. The floating vessel of claim 14, further comprising:
one or more blast evaporators that are operable to provide air temperature in the ultra-low temperature region that ranges from between −50 degrees Fahrenheit to −80 degrees Fahrenheit.

18. The floating vessel of claim 17 comprising a refrigerant source that is fluidly coupled to the one or more blast evaporators, the refrigerant source providing Freon.

19. The floating vessel of claim 14 wherein the fully intact fish is cooled to a temperature of at least −10 degrees Fahrenheit in the ultra-low temperature region.

20. The floating vessel of claim 14, further comprising:
a ram assembly that is operable to move the fully intact fish in the ultra-low temperature region between a plurality of zones.

21. The floating vessel of claim 14 wherein the preliminary sorting apparatus includes one or more tanks in fluid communication with one or more ice slush machines.

22. A method for processing fish, the method comprising:
transporting fully intact fish to a floating vessel;
at least one of weighing and sorting the fully intact fish;
forming a layer of frozen slime on an outer surface of skin of the fully intact fish; and
freezing the fully intact fish by moving the fully intact fish through an ultra-low air temperature region, wherein freezing the fully intact fish includes moving the fully intact fish through a plurality of zones of an ultra-low temperature region.

* * * * *